Jan. 5, 1965 T. M. MORRIS 3,164,396
TWO-WHEELED MOTOR VEHICLE WITH SINGLE PASSENGER COMPARTMENT
Filed May 3, 1963

INVENTOR.
THOMAS M. MORRIS
BY
*B. P. Fishburn, Jr.*
ATTORNEY 3,164,396
TWO-WHEELED MOTOR VEHICLE WITH SINGLE
PASSENGER COMPARTMENT
Thomas M. Morris, Ridgefield Park, N.J.
(420 E. 89th St., New York, N.Y.)
Filed May 3, 1963, Ser. No. 277,900
1 Claim. (Cl. 280—202)

This invention relates to vehicles of the motorcycle type and more particularly to a two wheeled vehicle adapted for use as a taxicab or for a recreational device.

The object of the invention is to provide a two wheeled motorcycle type vehicle having a cab or enclosure for a single passenger in addition to the driver who is seated exteriorly of and near the enclosure.

A further object is to provide a vehicle of the mentioned type which is narrow and highly maneuverable on congested streets, the width of the passenger cab approximating the overall width of the vehicle handle bars.

A further object is to provide a two wheeled taxicab where the single passenger faces rearwardly on a comfortable seat above the rear wheel and fully enclosed and protected from the elements, the vehicle being highly compact and very well balanced for ease of handling and stabilizing when at rest.

Another object is to provide a two-wheeled single passenger taxicab having means to allow the occupant of the cab to communicate readily with the driver, the heads of the occupant and driver being arranged normally in close proximity.

Still another object is to provide a vehicle of the mentioned type which is highly economical to operate and very well suited for use in highly congested cities.

Another object is to provide a taxicab for accommodating a single passenger economically, in view of the well known fact that a high percentage of the fares of conventional taxicabs represent single passengers only.

Other objects and advantages of the invention will be apparent during the course of the following description.

Figure 1:
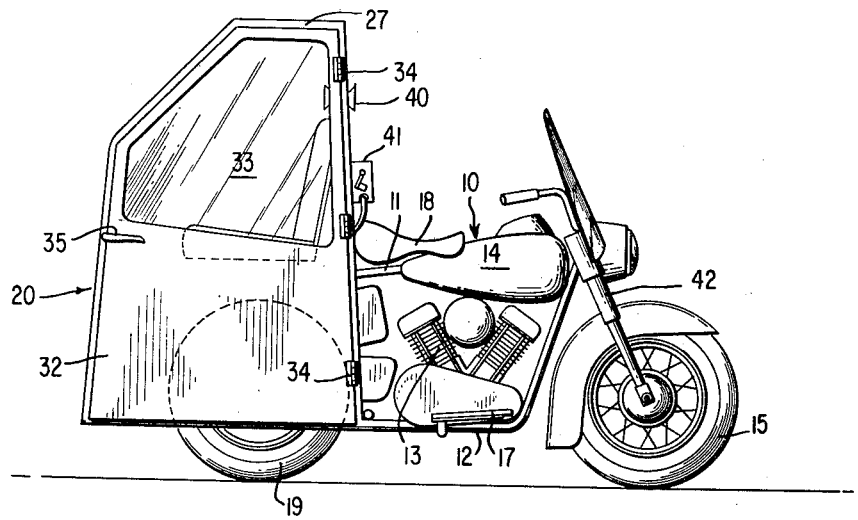
Figure 2:
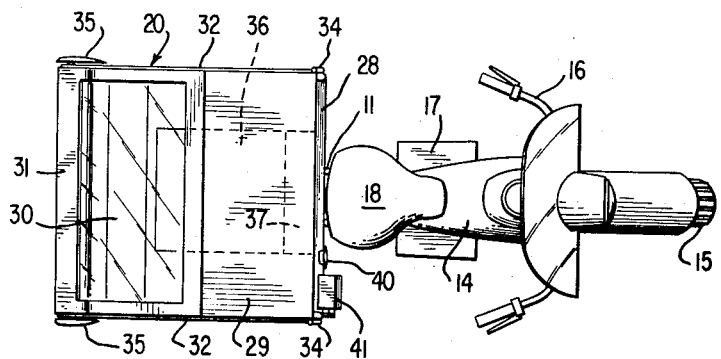
Figure 3:
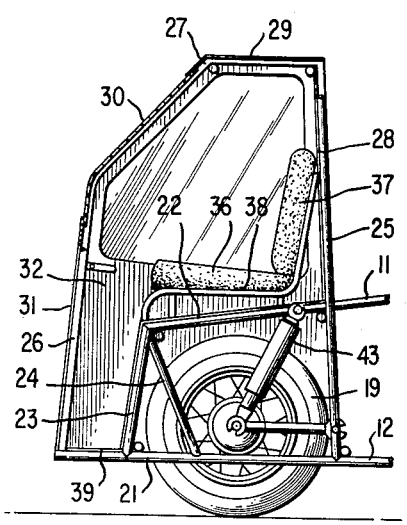

In the accompanying drawings forming a part of this application and in which like numerals are employed to designate like parts throughout the same, FIGURE 1 is a side elevation of a vehicle embodying the invention, FIGURE 2 is a plan view of the same, and FIGURE 3 is a fragmentary side elevational view, partly in section, with one door removed.

In the drawings, wherein for the purpose of illustration is shown a preferred embodiment of the invention, the two wheeled vehicle 10 in general is constructed in the manner of a conventional two wheeled motorcycle and has the usual upper and underslung frame members 11 and 12, air cooled motor 13, fuel tank 14, front steering wheel 15 with handle bar 16 and foot pedal means 17, all conventional. The operator's seat or saddle is shown at 18 rearwardly of the tank 14 and above the frame member 11. The rear traction wheel of the vehicle is designated at 19 and the conventional gearing and transmission means for powering the rear wheel 19 is omitted from the drawings along with certain other conventional items for simplification of illustration and because these conventional parts are not part of the invention.

A box-like single passenger cab 20 is provided on the vehicle adjacent the rear wheel 19 and straddling the same and projecting thereabove and somewhat rearwardly thereof. The lower frame member 12 of the vehicle is forked or bifurcated to provide lower rear horizontal frame extensions 21 on opposite sides of the rear wheel 19 and spaced outwardly therefrom equidistantly. The upper frame member 11 extends over the wheel 19 as at 22 and has depending leg portions 23 rigidly connected with the frame extensions 21 just rearwardly of the wheel 19. Diagonal braces 24 may be provided, as shown. Forward and rear substantially upright frames for the cab 20 are shown at 25 and 26, having their lower ends rigidly secured to the lower frame extensions 21, and the tops of the upright frames 25 and 26 are further rigidly interconnected by a roof frame 27 which may be suitably cross braced to complete the rigid box-like frame for the cab 20. The cab frame is well adapted to be integrated with the basic motorcycle frame by welding or by other suitable means. The cab 20 has its rear upper corner preferably cut away to provide a sloping portion as shown in the drawings, to render the cab further compact and lightweight without disturbing its balance.

The cab 20 has a suitable front enclosure wall or panel 28 formed of sheet metal or the like and suitably secured to the upright frame 25 and a similar roof panel 29 having a transparent window 30 and suitably applied to the roof frame 27. Likewise, a rear enclosure panel or wall 31 is secured to the rear upright panel 26 to complete the rear portion of the enclosure.

The opposite sides of the cab 20 are covered by two identical hinged doors 32 having transparent windows 33 in their upper portions, near the elevation of the window 30. Each door 32 is hinged at 34 along its forward generally vertical edge to the cab frame for horizontal swinging movement between open and closed positions. Each door has a suitable handle and latch means 35 at its rear edge portion which may be substantially conventional and in the nature of an automobile door handle and latch, equipped with a lock, if preferred. Thus access to the cab 20 by the passenger may be had from either side of the vehicle.

A rear facing single passenger seat is provided within the cab 20 directly above the wheel 19 and including a horizontal seat portion 36 and a back portion 37, both portions suitably cushioned for comfort. The seat structure includes a rigid frame 38 rigidly secured to the frame portion 22, as shown in FIGURE 3. The passenger seat extends laterally for the major portion of the width of the cab 20 and the overall width of the cab approximates the overall width of the handle bar 16, as shown in FIGURE 2. The construction is balanced and highly compact. The passenger within the cab 20 sitting upon the seat structure faces rearwardly and there is sufficient room for his feet upon the floor panel 39 of the cab, rearwardly of the wheel 19.

A speaking tube 40 is suitably mounted upon the front wall of the cab 20 near and above the seat back 37 so as to be close to the heads of both the driver and the passenger, thereby allowing the driver and passenger to communicate readily without changing their positions appreciably. A conventional fare meter 41 may also be mounted upon the forward side of the cab in ready reach of the driver.

Substantially conventional front and rear resilient suspension means 42 and 43 for the two wheels of the vehicle are provided as indicated.

Other optional features may be added, such as interior safety padding for the cab 20, a visible light indicator in front of the driver to show that the doors are closed, a push button buzzer in the cab to signal the driver to stop the vehicle, side bumpers on the cab for added safety, and passenger-operated air vent means to regulate air circulation through the cab.

It is to be understood that the form of the invention herewith shown and described is to be taken as a preferred example of the same, and that various changes in the shape, size and arrangement of parts may be resorted to, without departing from the spirit of the invention or scope of the subjoined claim.

Having thus described my invention, I claim:

A two-wheeled compact taxicab vehicle of the motorcycle type adapted to seat a driver and a single passenger, said vehicle comprising a generally conventional motorcycle chassis including handle bar steering means for the front wheel of said chassis and an open driver's seat of the saddle type rearwardly of the handle bar means and intermediate the front and rear wheels of the chassis, an upright box-like enclosed single passenger cab rigidly secured to the frame of said chassis adjacent the rear wheel thereof and including a forward substantially vertical wall immediately rearwardly of the driver's seat and extending thereabove for a substantial distance and being of a width on opposite sides of the driver's seat to substantially equal the width of said handle bar means, said cab having a roof portion of sufficient height to clear the head of a passenger seated in said cab and also including a rear generally vertical wall spaced rearwardly of the rear wheel of said chassis and extending from said roof to a point below the axle of the rear wheel, said cab also having a horizontal floor portion at the bottom of said rear wall and between the rear wall and said rear wheel, said cab including a pair of side walls, at least one of which comprises a horizontally swinging side opening door extending for substantially the full height of the cab and the full length thereof longitudinally of the chassis, and a single passenger seat within said cab near the vertical center thereof and mounted upon the chassis frame immediately above said rear wheel and being rearwardly facing and having a substantially horizontal seat portion and a substantially vertical back rest portion, said back rest portion being close to the forward wall of the cab and the rear edge of the seat portion terminating near the rear side of said rear wheel, whereby the passenger may place his feet on said floor portion between the rear wheel and rear cab wall, the side walls of the cab being spaced apart a sufficient distance to confortably accommodate the shoulders of said passenger, there being panel elements on said cab beneath the passenger seat forming a well within which the rear wheel of the chassis operates.

References Cited in the file of this patent

UNITED STATES PATENTS

| | | |
|---|---|---|
| 631,124 | Perpente | Aug. 15, 1899 |

FOREIGN PATENTS

| | | |
|---|---|---|
| 13,285 | Switzerland | Nov. 9, 1896 |
| 111,546 | Germany | June 5, 1898 |
| 540,386 | Germany | Dec. 14, 1931 |
| 906,413 | Germany | Mar. 15, 1954 |
| 509,382 | France | Oct. 13, 1920 |
| 27,340 | Denmark | Mar. 12, 1921 |
| 586,725 | Italy | Dec. 18, 1958 |